United States Patent [19]
Dowling et al.

[11] Patent Number: 5,737,875
[45] Date of Patent: Apr. 14, 1998

[54] TENSION APPARATUS OF A VEHICLE DOOR POWERED SLIDING DEVICE

[75] Inventors: Patrick Dowling; Manabu Nakajima, both of Yamanashi-ken, Japan

[73] Assignee: Mitsui Kinzoku Kogyo Kabushiki Kaisha, Tokyo, Japan

[21] Appl. No.: 710,534

[22] Filed: Sep. 19, 1996

[30] Foreign Application Priority Data

Sep. 20, 1995 [JP] Japan ..................... 7-266499

[51] Int. Cl.⁶ ............................... E05F 11/00
[52] U.S. Cl. .......................... 49/360; 474/134
[58] Field of Search ................ 49/360; 254/242, 254/216, 226, 281, 284, 285, 333, 336; 474/101, 133, 134, 135, 148, 150, 273

[56] References Cited

U.S. PATENT DOCUMENTS

| | | | |
|---|---|---|---|
| 2,425,476 | 8/1947 | Lade et al. | 474/134 X |
| 3,804,371 | 4/1974 | Mills et al. | 254/336 |
| 3,895,544 | 7/1975 | Suzaki | 474/134 X |
| 4,617,757 | 10/1986 | Kagiyama et al. | 49/360 X |
| 4,932,715 | 6/1990 | Kramer | 49/360 X |
| 5,046,283 | 9/1991 | Compeau et al. | |
| 5,168,666 | 12/1992 | Kouda et al. | 49/360 |
| 5,323,570 | 6/1994 | Kuhlman et al. | 49/360 |

*Primary Examiner*—Jerry Redman
*Attorney, Agent, or Firm*—Browdy and Neimark

[57] ABSTRACT

A tension apparatus of a vehicle door powered sliding device comprises a motor fixed to a base plate, a wire drum mounted to the base plate by a first shaft and rotated by the motor, a wire cable provided between a vehicle sliding door and the wire drum for pulling the sliding door forward or rearward when the wire drum rotates, first and second tension arms rotatably mounted on the first shaft and having tension rollers which makes contact with the wire cable, an intermediate lever rotatably mounted on the first shaft, an adjusting member for fixing the first tension arm and the intermediate lever so that an angle of the first tension arm and the intermediate lever can be adjusted, a tension spring provided between the intermediate lever and the second tension arm.

14 Claims, 17 Drawing Sheets

5,737,875

TENSION APPARATUS OF A VEHICLE DOOR POWERED SLIDING DEVICE

BACKGROUND OF THE INVENTION

The present invention relates to a tension apparatus, and more particularly, to a tension apparatus of a vehicle door powered sliding device.

PRIOR ART OF THE PRESENT INVENTION

Conventionally, there are many sliding devices for sliding a sliding door, which are slidably attached to a vehicle body in a longitudinal direction of the vehicle body, by the power of the motor. U.S. Pat. No. 5,046,283 describes a powered sliding device which comprises a first wire drum connected to a first wire cable for pulling a sliding door forward, a second wire drum connected to a second wire cable for pulling the sliding door rearward, and a tension spring provided between the first and second drums. The tension spring applies a predetermined tension pressure to the wire cables by urging the first drum in a clockwise direction and urging the second drum in a counter-clockwise direction.

The prior art tension spring is expanded or contracted when the length of the wire cable is changed during the use thereof. Further, the prior art tension spring is expanded or contracted according to the error of the length of the wire cable caused at the time of production thereof. In this way, when the length of the tension spring is changed, the tension pressure applied to the wire cable cannot be maintained at a constant.

SUMMARY OF THE PRESENT INVENTION

Accordingly, it is an object of the present invention to provide a tension apparatus which can maintain the tension pressure of the wire cable even if the wire cable has an error in length caused at the time of the production thereof.

It is another object of the present invention to provide a tension apparatus which can easily adjust the tension pressure of the wire cable even if the length of the wire cable is changed during the use thereof.

DESCRIPTION OF THE PREFERRED EMBODIMENTS

Figure 2:
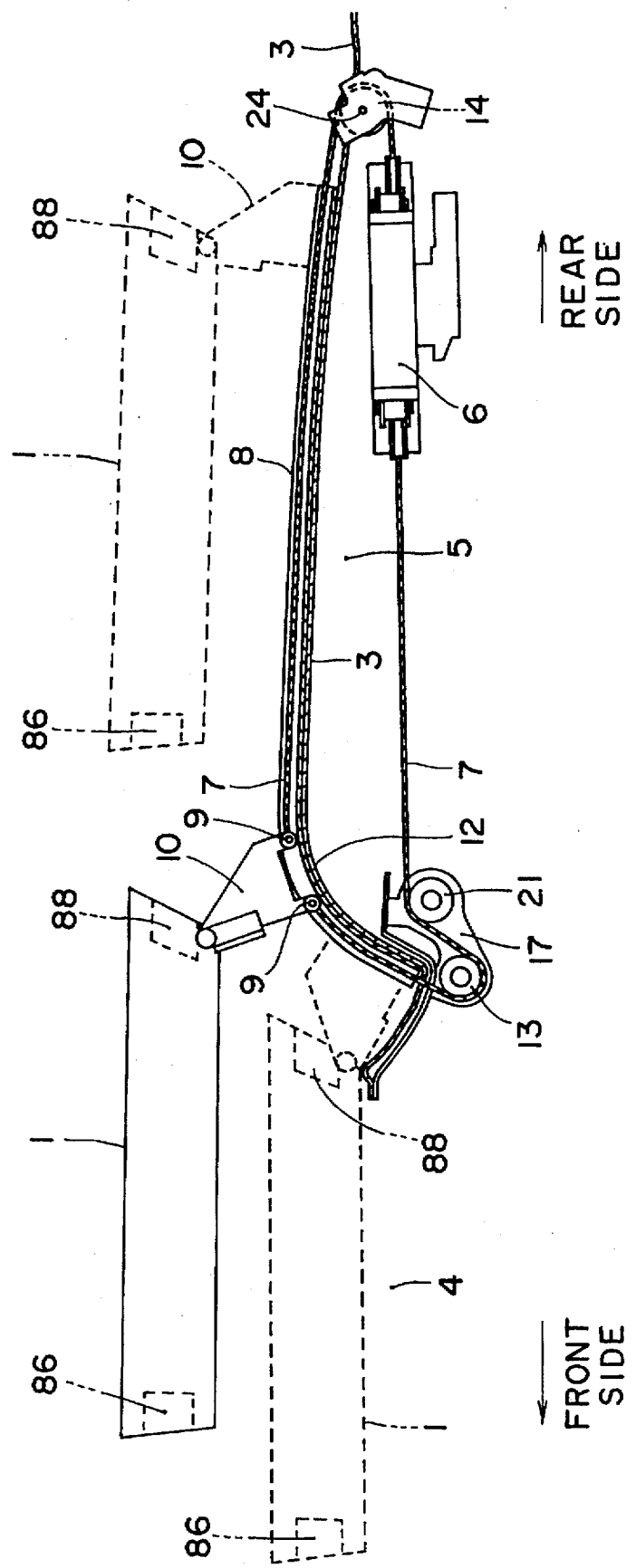
FIG. 2 is a partly sectional view showing a relationship between the sliding door and a guide rail.

Explanation will be made of embodiments of the present invention with reference to the accompanying drawings. As shown in FIG. 2, a vehicle body 2 has a sliding door 1 which is slidable in a longitudinal or front-and-rear direction of the body 2 between an open position where the sliding door 1 is opposite rear outer side panel or quarter panel 3 of the body 2 and a closed position for closing an entrance 4 of the body 2, and a powered sliding unit 6 for sliding the door 1 mounted within an inner space 5 inside of the side panel 3.

Figure 3:
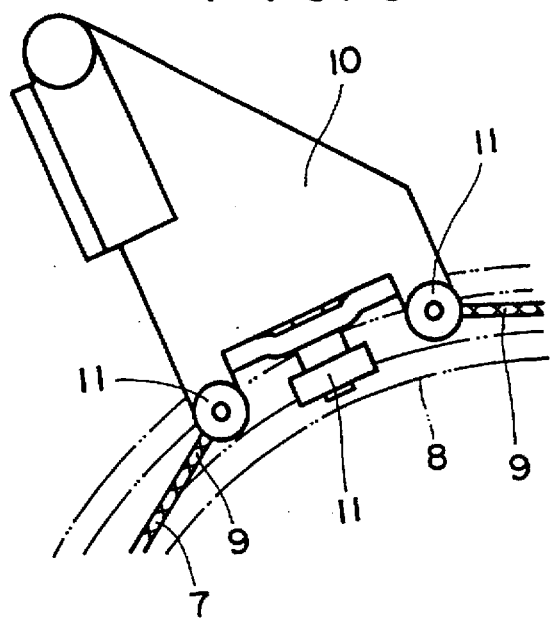
FIG. 3 is a plan view of a coupling bracket of the sliding door.
Figure 4:
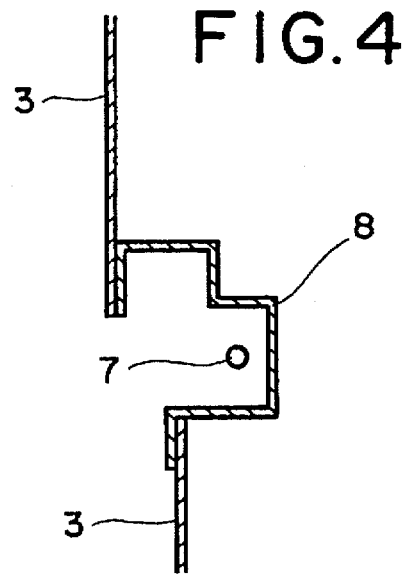
FIG. 4 is a sectional view of the guide rail.

The sliding door 1 and the powered sliding unit 6 are connected with each other through a wire cable 7, one half of which is located in the inner space 5, and the other half of which is fitted, as shown in FIG. 4, within a guide rail 8 secured to the side panel 3. As shown in FIG. 3, both end parts 9 of the cable 7 are coupled to a coupling bracket 10 which is rotatably attached to the door 1. Three rolls 11 of the coupling bracket 10 are slidably engaged with the guide rail 8. When the coupling bracket 10 is towed by the sliding unit 6 by cable 7, the sliding door 1 is moved in the longitudinal direction of the body 2 along the guide rail 8.

Figure 6:
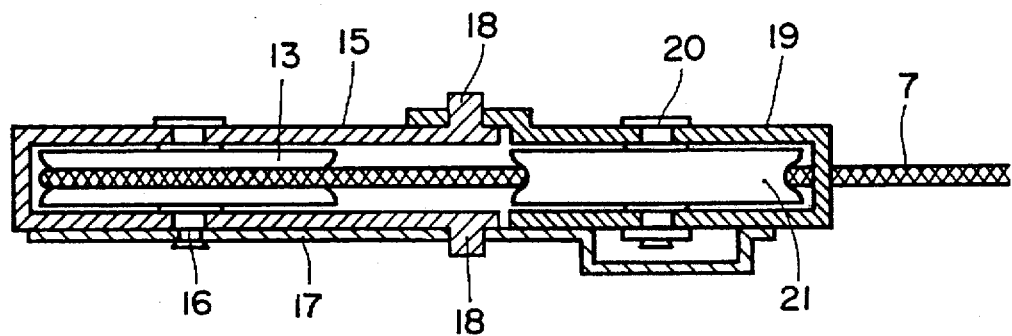
FIG. 6 is a developed sectional view of FIG. 5.
Figure 5:
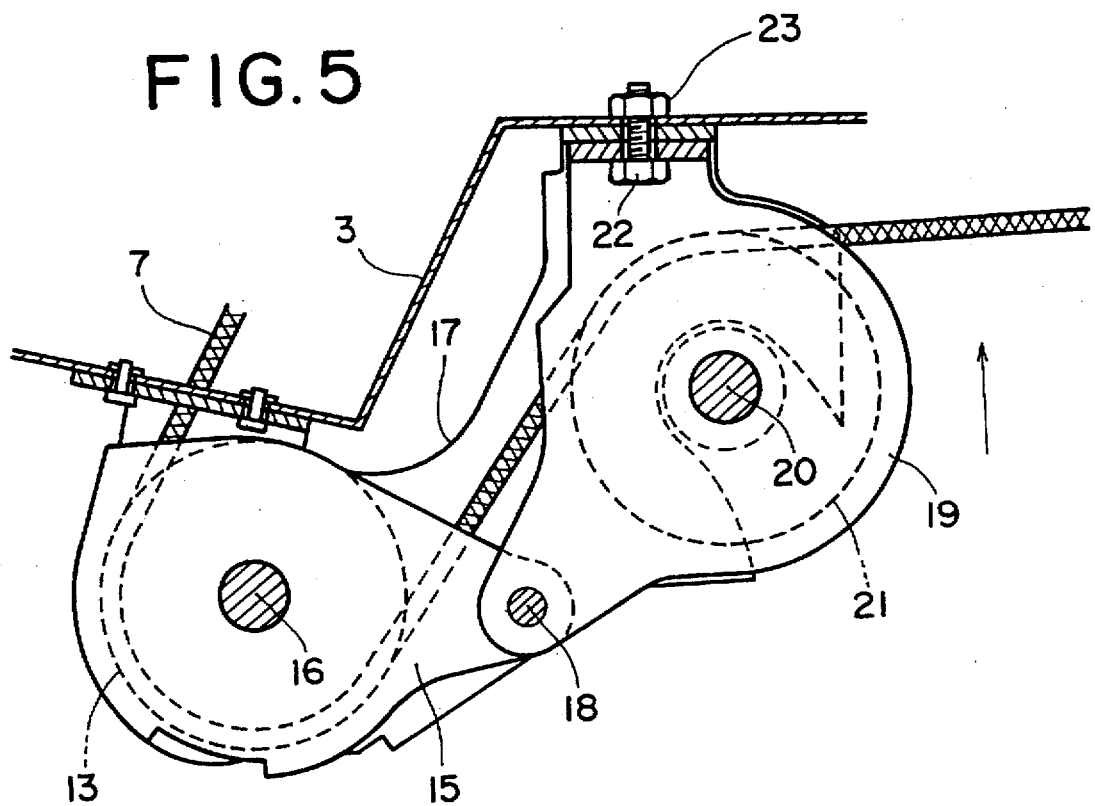
FIG. 5 is a partly sectional plan view showing an initial tension mechanism.

The guide rail 8 is horizontally laid, and is formed in its front side part with a corner portion 12 which is curved toward an interior side of the vehicle body 2. A front pulley 13 for the cable 7 is located in the vicinity of the front end part of the guide rail 8, and a rear pulley 14 for the cable 7 is located in the vicinity of the rear end part of the guide rail 8. As shown in FIGS. 5 and 6, the front pulley 13 is first inserted in a holder 15 for preventing the cable 7 from coming off, then, it is attached to a bracket 17 fixed to the side panel 3 by a vertical shaft 16. Boss portions 18 formed on the holder 15 are fitted thereon with a tension plate 19 to which a tension pulley 21 for applying an initial tension to the cable 7 is journalled by a vertical shaft 20.

Figure 7:
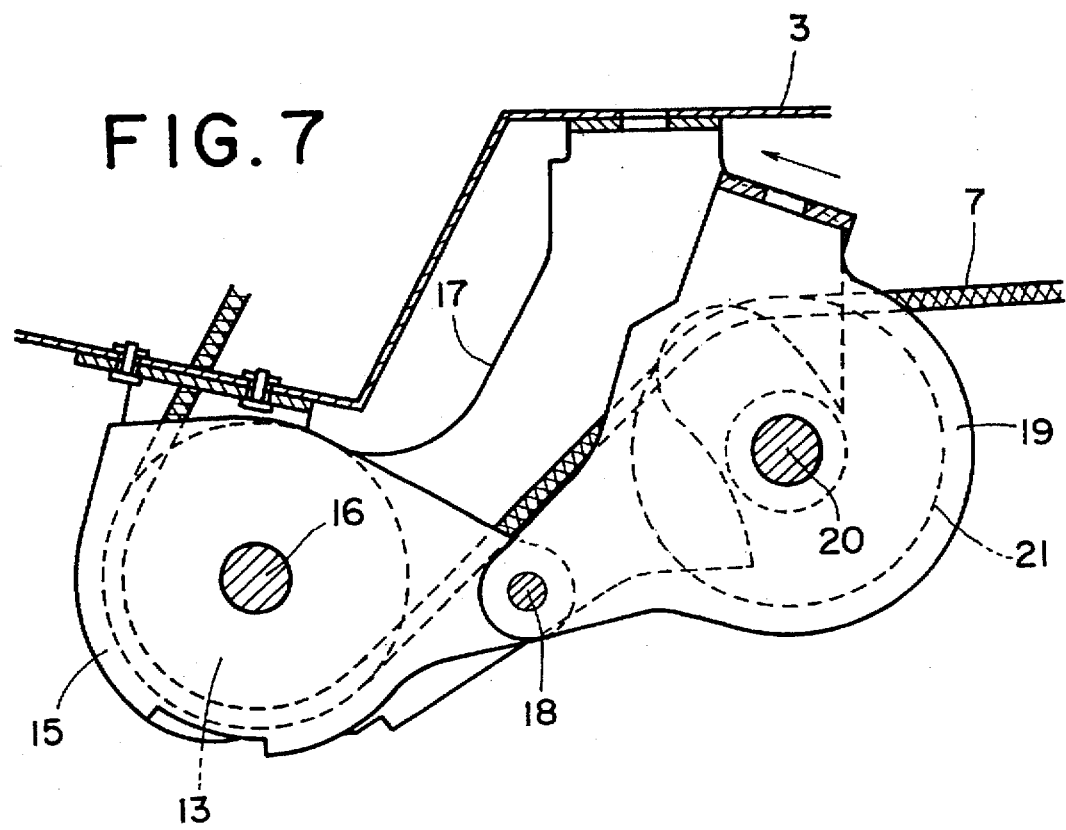
FIG. 7 is a partly sectional plan view showing the initial tension mechanism in which a tension pulley is in a free condition.

The tension plate 19 and the tension pulley 21 are set in a free condition, as shown in FIG. 7, when the cable 7 is attached to the coupling bracket 10 and the powered sliding unit 6. After the completion of the set-up of the cable 7, the tension plate 19 is turned about the boss portions 18 by the hand toward the side panel 3, then, it is fixed to the side panel 3 by a bolt 22 and a nut 23, as shown in FIG. 5.

Figure 9:
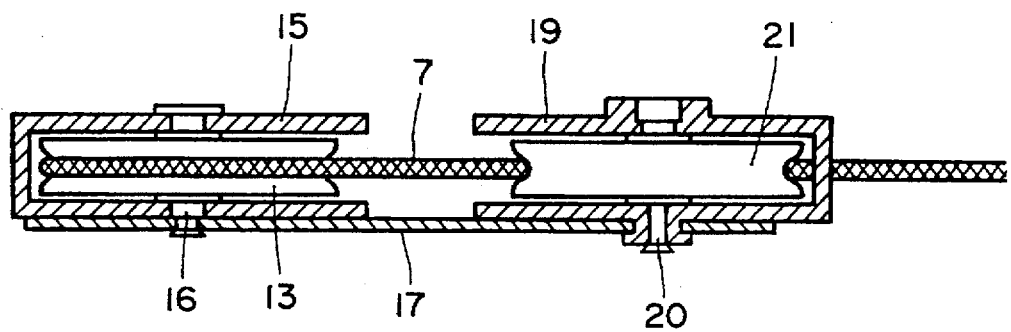
FIG. 9 is a developed sectional view of FIG. 8.
Figure 8:
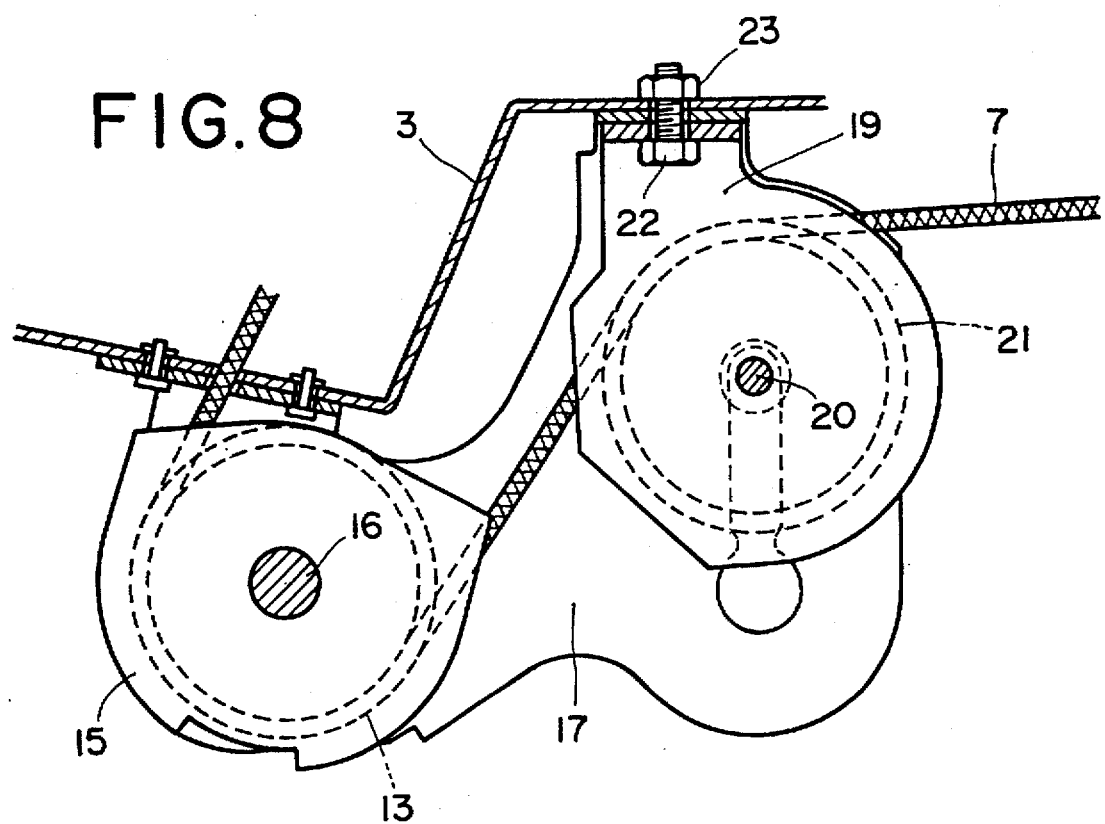
FIG. 8 is a partly sectional plan view showing another initial tension mechanism.
Figure 10:
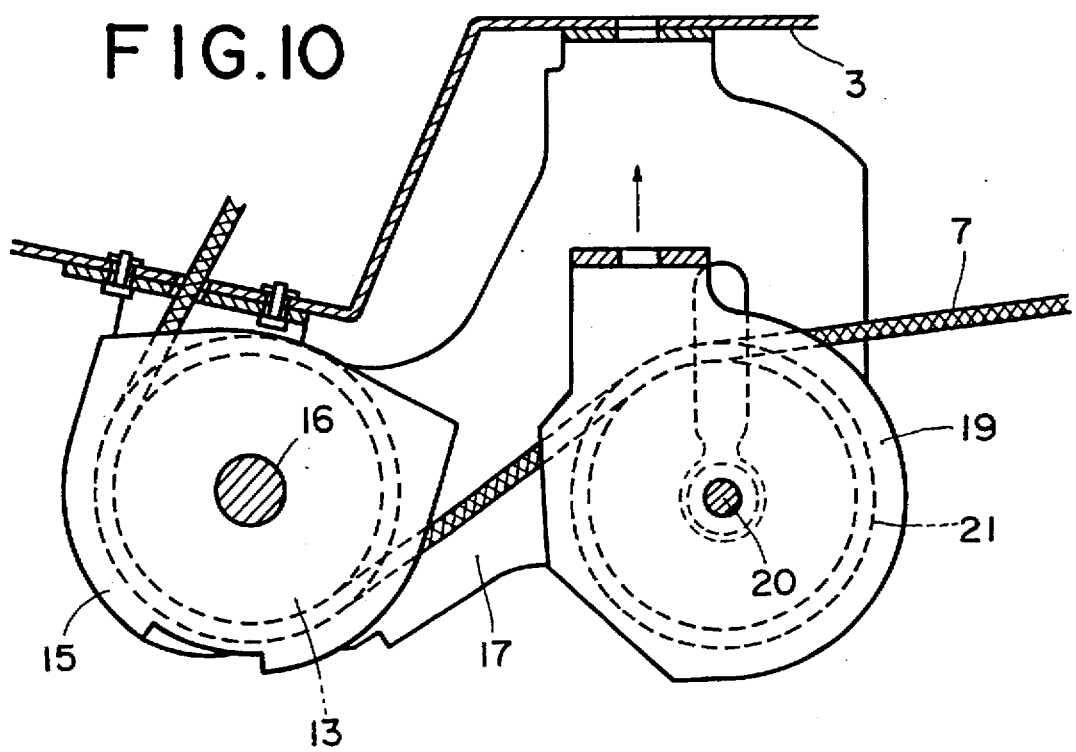
FIG. 10 is a partly sectioned plan view showing the initial tension mechanism of FIG. 8 in which a tension pulley is in a free condition.

FIGS. 8 to 10 show another type of the tension plate 19 which is slidably attached to the bracket 17.

Figure 12:
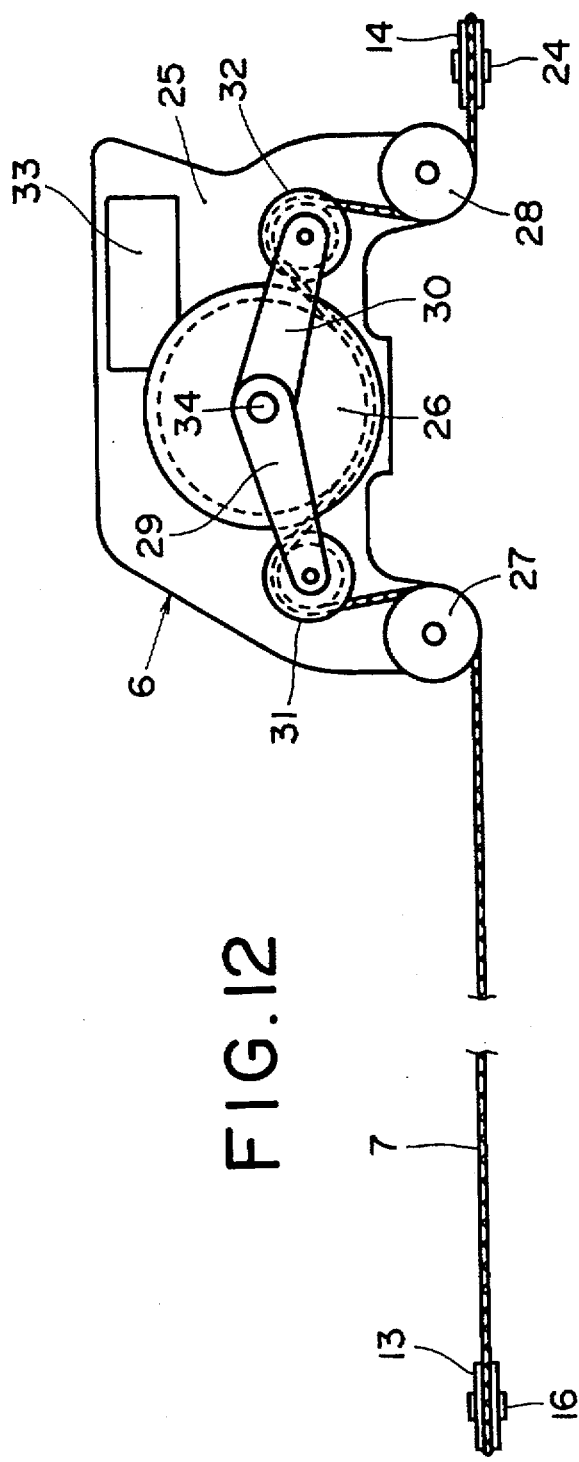
FIG. 12 is a partly-broken front view showing a wire cable and a powered sliding unit which will be attached an inner space inside of a rear outer side panel.
Figure 11:
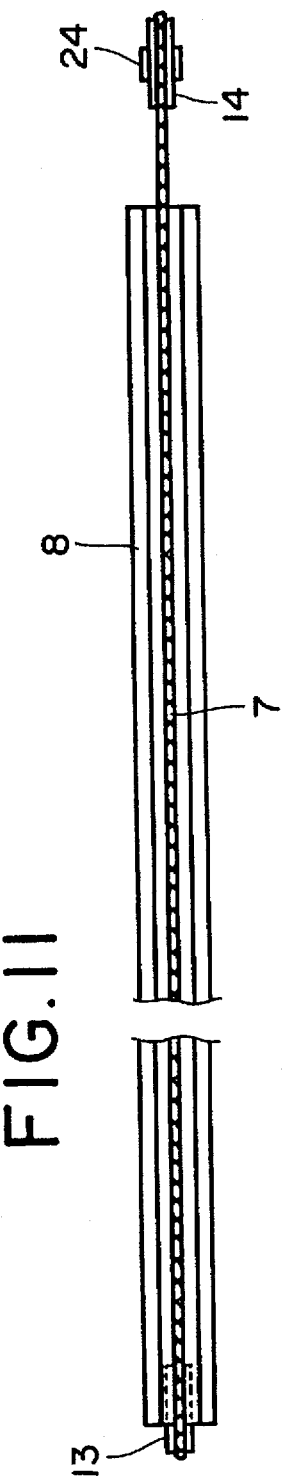
FIG. 11 is a partly-broken front view of a guide rail.

The rear pulley 14 is journalled to the rear side panel 3 by a vertical shaft 24, and further, as shown in FIG. 12, is located at the same height as that of the front pulley 13. The powered sliding unit 6 is located between the front pulley 13 and the rear pulley 14 so that the cable 7 between the front pulley 13 and the sliding unit 6 is substantially in parallel with the cable 7 between the sliding unit 6 and the rear pulley 14. Thus, the wire cable 7 is kept horizontal except the portion within the sliding unit 6, thereby the overall length of the cable 7 becomes shorter, and the elongation and contraction of the cable 7 due to aging effect can be reduced. Further, the horizontally laid cable 7 can eliminate the necessity of a wire shell which surrounds the outer periphery of the cable 7. Accordingly, the exposed cable 7 can be used in the present invention.

As shown in FIG. 12, the powered sliding unit 6 has a substantially vertical base plate 25 fixed to the vehicle body 2, a wire drum 26 journalled to the base plate 25, a pair of counter pulleys 27, 28 journalled to the base plate 25, a pair of tension arms 29, 30 journalled to the base plate 25 by a shaft 34, and a motor 33 for rotating the wire drum 26. Tension rollers 31, 32 are rotatably attached to the tension arms 29, 30, respectively. The counter pulleys 27, 28 are located at the same height as that of the front and rear pulleys 13 and 14 so that the cable 7 in the inner space 5 is horizontally laid. Further, the vertical base plate 25 is substantially in parallel with the cable 7 within the inner space 5.

Figure 13:
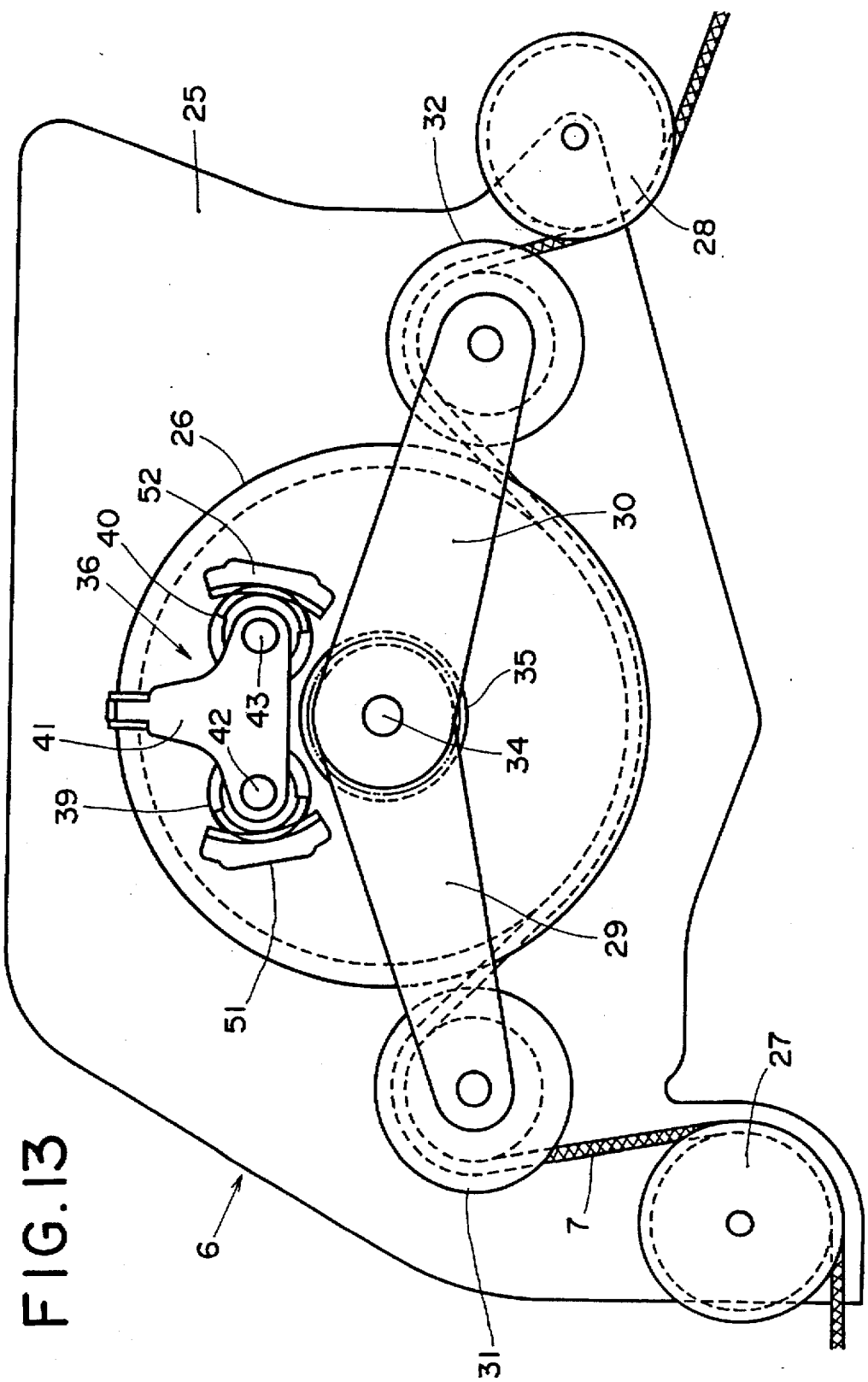
FIG. 13 is an enlarged front view showing the powered sliding unit.

As shown in FIG. 13, the wire drum 26 is supported to the base plate 25 by a horizontal shaft 34. A gear 35 is fixed to the wire drum 26, and a clutch mechanism 36 is arranged between the gear 35 and the motor 33.

Figure 14:
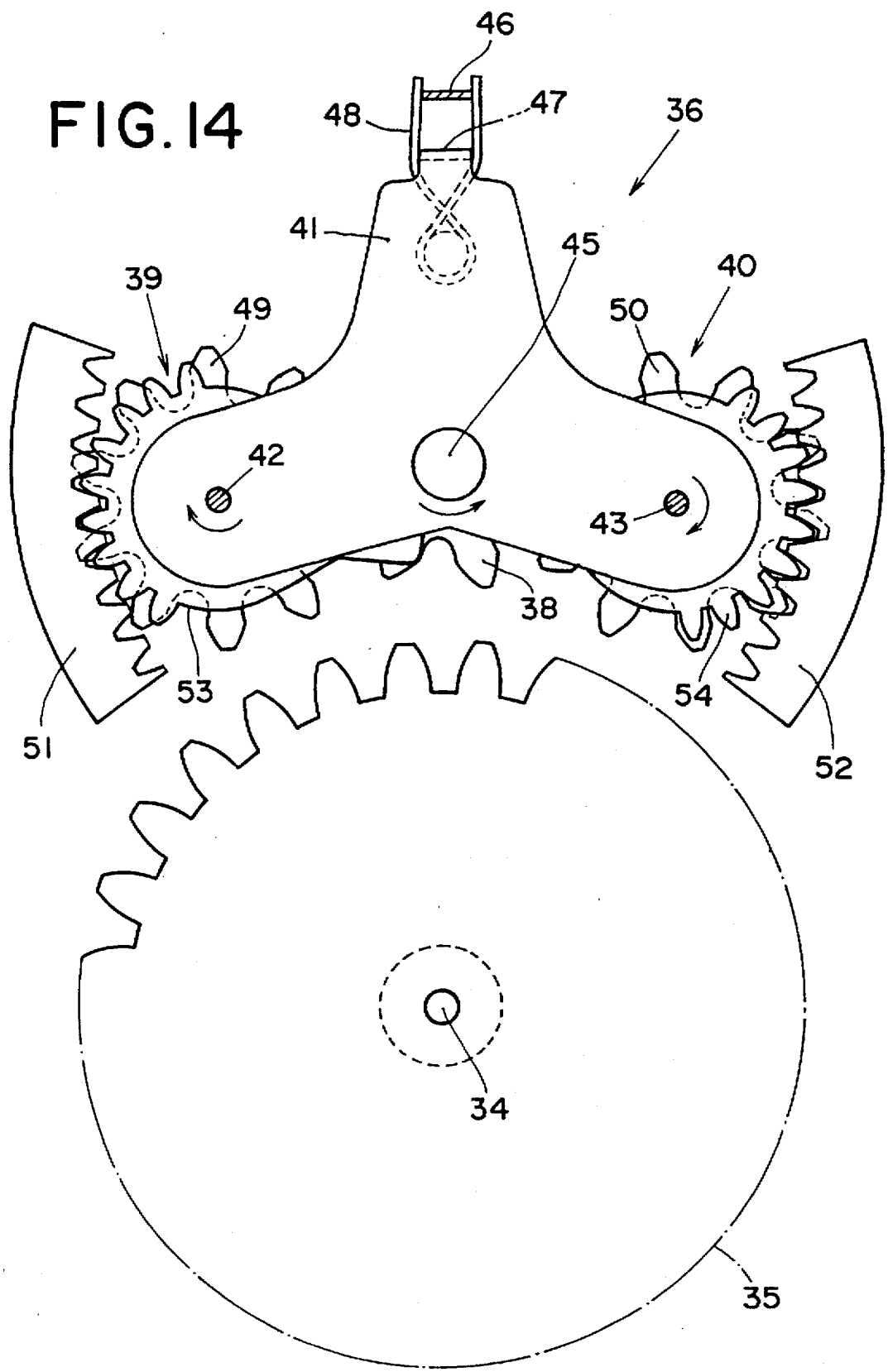
FIG. 14 is a front view showing a clutch mechanism of the powered sliding unit in a disengaged condition.

Details of the clutch mechanism 36 are shown in FIG. 14 to 18. An output gear 38 is fixed to an output shaft 37 of the motor 33. Clutch members 39, 40 are provided on opposite sides of the output gear 38, and are supported to a T-shaped swingable member 41 by shafts 42, 43. The swingable member 41 is rotatably supported to a cover plate 44 fixed to the base plate 25 by a shaft 45. The center axis of the shaft 45 is the same as that of the output shaft 38. The swingable member 41 is held at a neutral position as shown in FIG. 14 by means of the resilient force of a return spring 48 which clamps a bent portion 46 of the cover plate 44 and a bent portion 47 of the swingable member 41.

The clutch member 39 has a first gear 49 meshed with the output gear 38, and a second gear 53 meshed with an arcuate rack 51 fixed to the base plate 25, and also the clutch member 40 has a first gear 50 meshed with the output gear 38, and a second gear 54 meshed with an arcuate rack 52 fixed to the base plate 25. The second gears 53, 54 make contact with the first gears 49, 50, respectively, with predetermined frictional resistance so that one of the first gears 49, 50 and the corresponding one of the second gears 53, 54 are rotated with each other.

Figure 15:
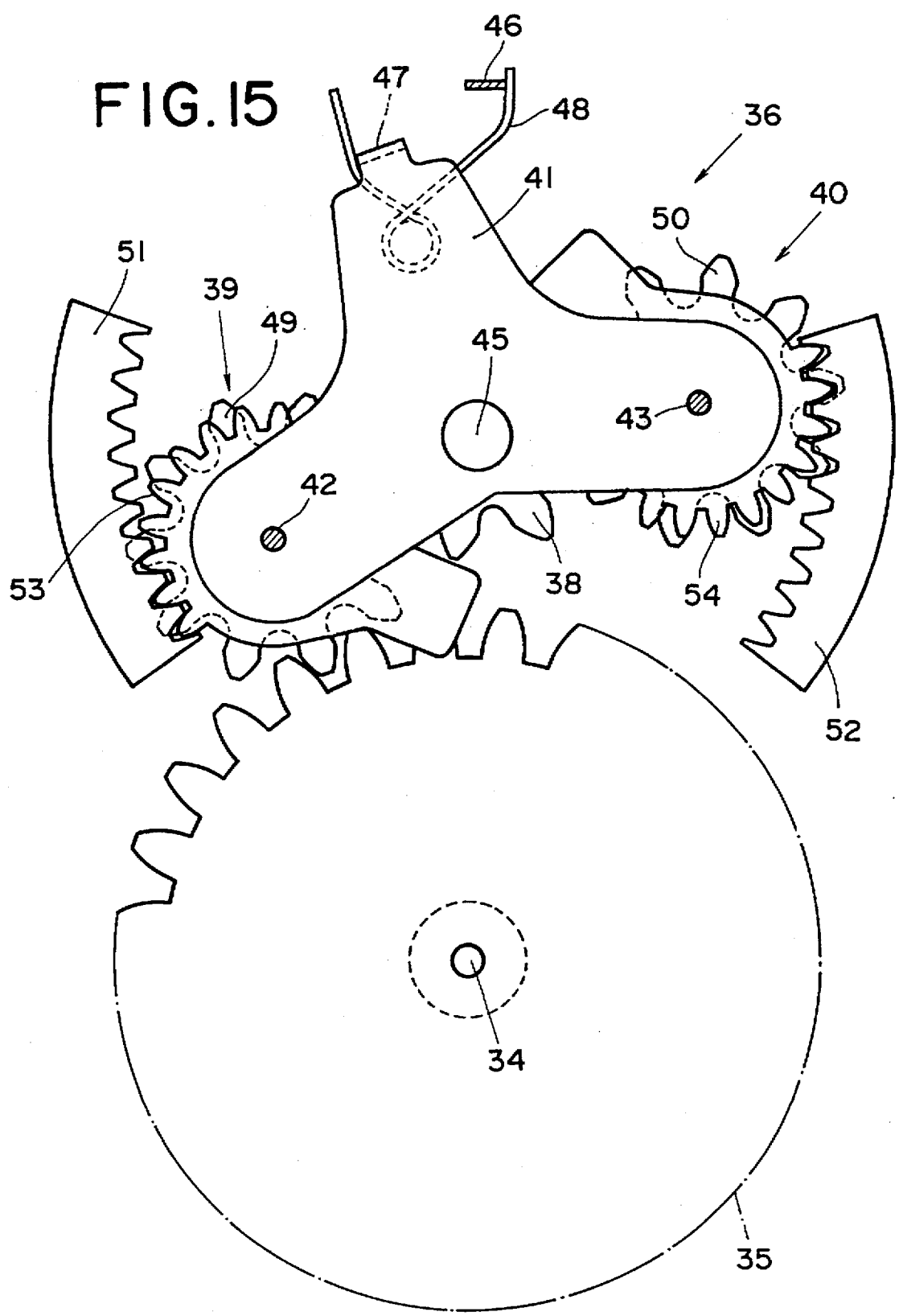
FIG. 15 is a front view showing the clutch mechanism in an engaged condition.
Figure 16:
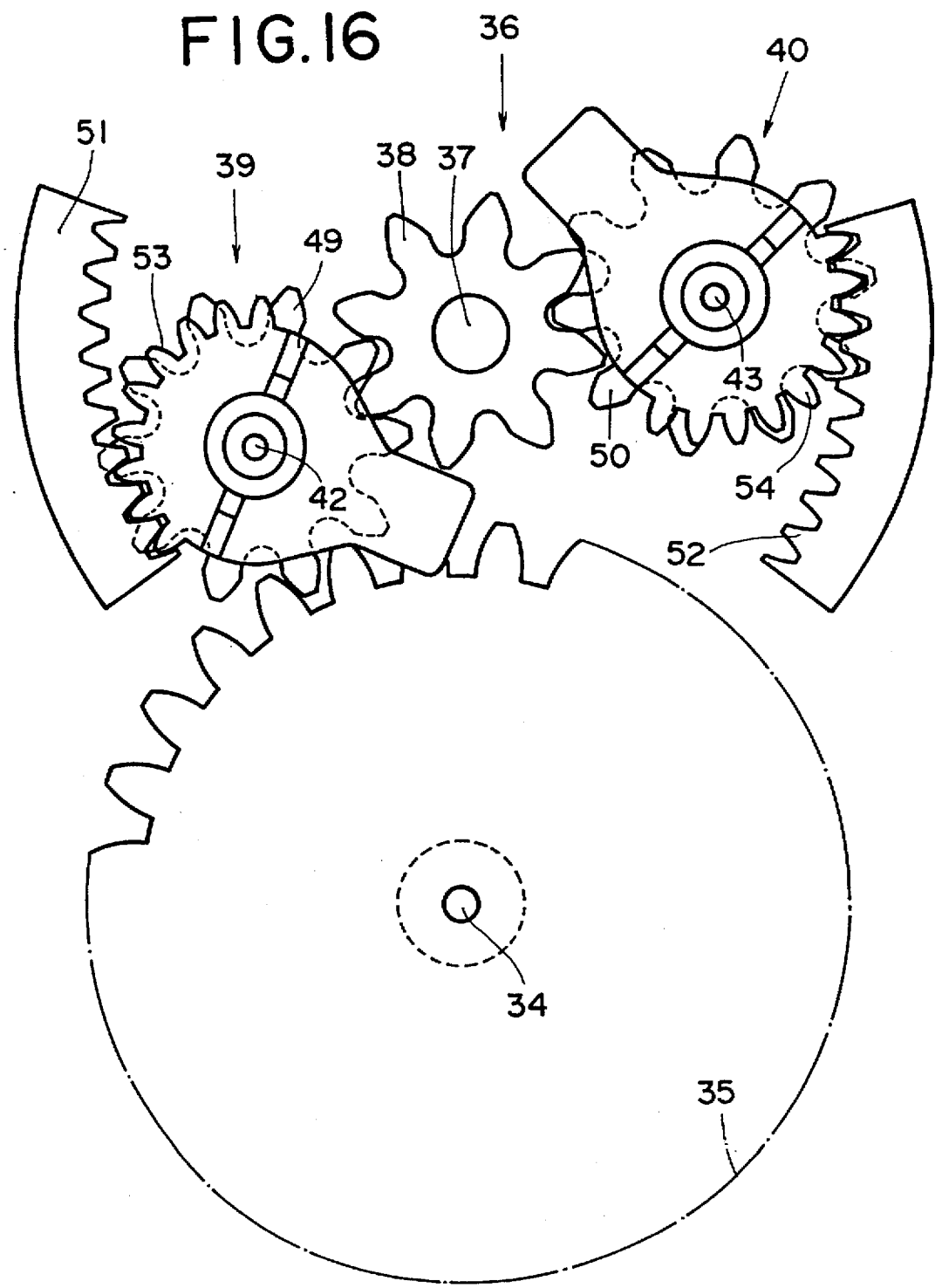
FIG. 16 is a front view showing the clutch mechanism from which a T-shaped swingable member is removed.
Figure 17:
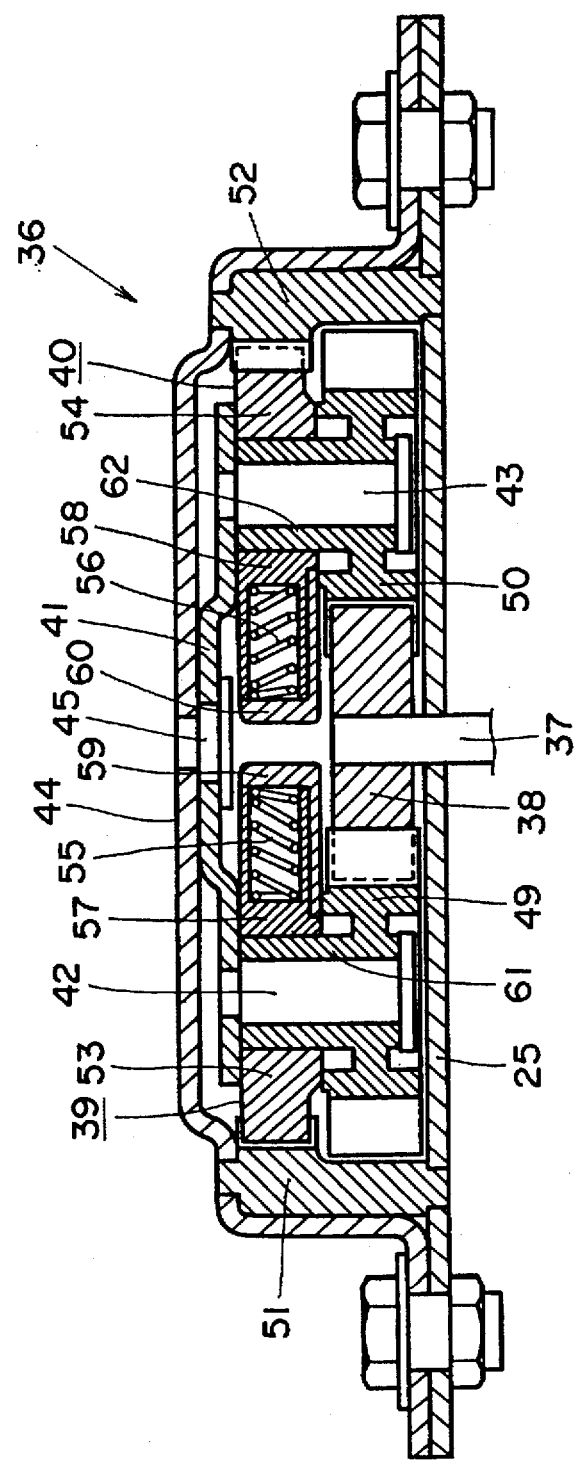
FIG. 17 is a cross-sectional view showing the clutch mechanism.
Figure 18:
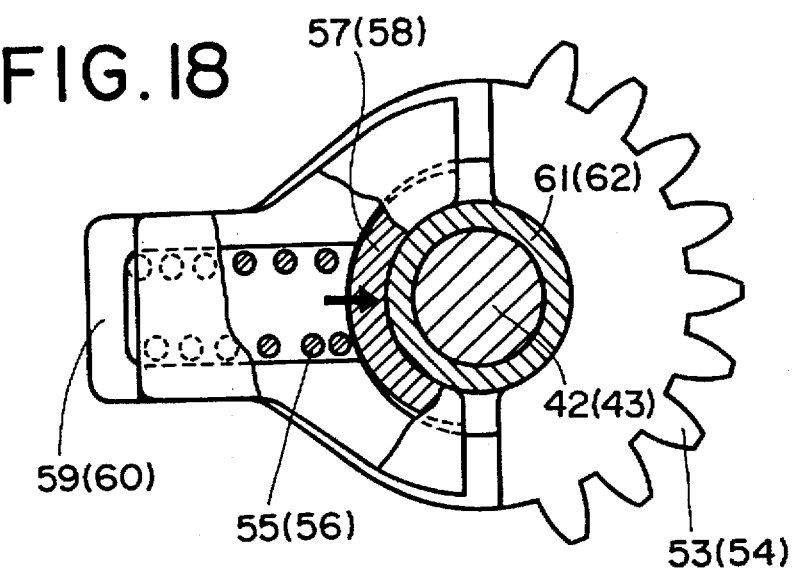
FIG. 18 is a partly cutaway sectional view showing a second gear and a brake shoe of a clutch member.

In the condition as shown in FIG. 14, when the first gears 49, 50 are rotated clockwise by the output gear 38, as indicated by the arrow, the second gears 53, 54 are also rotated clockwise due to the frictional resistances between the first gears and the second gears. As a result, due to the engagements between the second gears 53, 54 and the racks 5 51, 52, the swingable member 41 is turned counterclockwise as shown in FIG. 15, thereby the first gear 49 of the left side is meshed with the gear 35 of the wire drum 26. Then, the wire drum 26 is rotated counterclockwise. On the contrary, when the first gears 49, 50 and the second gears 53, 54 are rotated counterclockwise, the swingable member 41 is turned clockwise, thereby the first gear 50 of the right side is meshed with the gear 35 of the wire drum 26. Then, the wire drum 26 is therefore rotated clockwise. Further, as the motor 33 is not energized in the state shown in FIG. 15, the swingable member 41 is returned to the neutral position by the resilient force of the return spring 48, thereby the coupling between the motor 33 and the wire drum 26 is released.

The frictional resistances between the first gear 49 and the second gear 53 and between the first gear 50 and the second gear 54 are caused by springs 55, 56 and brake shoes 57, 58, respectively. The springs 55, 56 are respectively arranged between end edges 59, 60 of the second gears 53, 54 and brake shoes 57, 58 so that the brake shoes 57, 58 are biased toward boss portions 61, 62 of the first gears 49, 50, respectively.

Figure 20:
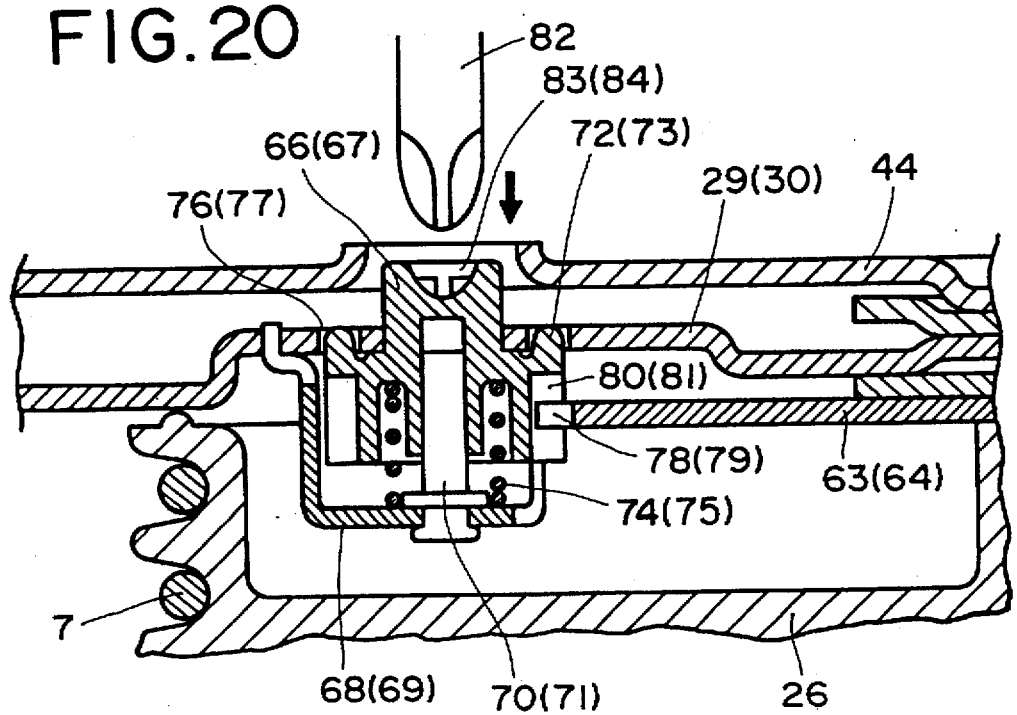
FIG. 20 is an enlarged sectional view showing the final tension mechanism.
Figure 19:
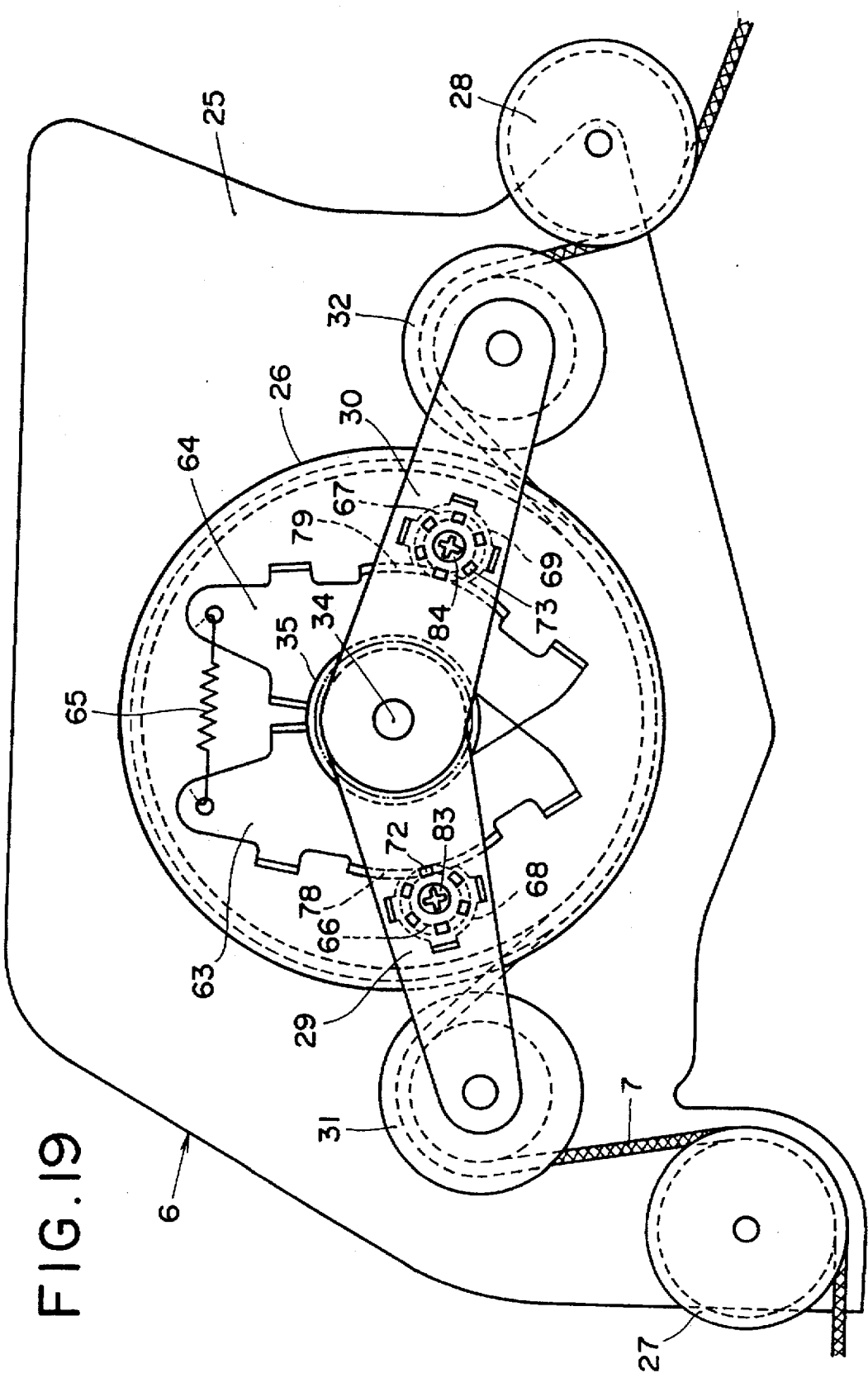
FIG. 19 is a front view showing a final tension mechanism for the wire cable.

FIGS. 19 and 20 show a tension adjusting mechanism for the wire cable 7. The adjusting mechanism is adapted to carry out the final adjustment of the tension pressure of the cable 7 to which the initial tension is already applied by the tension pulley 21 shown in FIGS. 5 to 9. The tension adjusting mechanism has a pair of adjusting plates 63, 64 which are rotatably attached to the shaft 34. A tension spring 65 is connected with the adjusting plates 63 and 64.

The tension adjusting mechanism further has a pair of adjusting members 66, 67 which are rotatably and slidably attached to pin 70, 71 of brackets 68, 69 fixed to the arms 29, 30, respectively. A plurality of protrusions 72, 73 of the adjusting members 66, 67 are engaged in a plurality of holes 76, 77 formed in the arms 29, 30 by the resilient forces of springs 74, 75, respectively. Gear portions 80, 81 formed on the adjusting members 66, 67 are meshed with arcuate gear portions 78, 79 of the adjusting plates 63, 64.

The left tension arm 29 and the left adjusting plate 63 are integrally coupled with each other through the engagement between the gear part 78 and the gear part 80, and the right tension arm 30 and the right adjusting plate 64 are integrally coupled with each other through the engagement between the gear part 79 and the gear part 81. Accordingly, the arms 29, 30 are urged by the resilient force of the tension spring 65 in the direction in which the wire cable 7 is tensed.

The adjusting members 66, 67 have grooves 83, 84 in which a driver 82 is engagable. By turning the adjusting members 66, 67 using the driver 82, the angle between the tension arm 29 and the adjusting plate 63 and the angle between the tension arm 30 and the adjusting plate 64 can be independently adjusted.

When the initial tension is applied to the cable 7 by the tension pulley 21, the cable 7 causes the tension arms 29, 30 to turn against the resilient force of the tension spring 65. At this time, if a manufacturing error in the length of the cable 7 is occurred, the length of the stretched spring 65 is not constant. If the length of the stretched spring 65 is longer than the designed length due to the shorter length of the cable 7, the tension pressure becomes larger. On the contrary, if the length of the stretched spring 65 is shorter due to the longer length of the cable 7, the tension pressure becomes less. In these cases, the angle between the tension arm 29 and the adjusting plate 63 and the angle between the tension arm 30 and the adjusting plate 64 are changed by turning both adjusting members 66, 67 using the driver 82 so as to adjust the length of the stretched spring 65 to the designed length after the initial tension is applied to the cable 7 by the tension pulley 21. Accordingly, in the present invention even though a manufacturing error is occurred in the length of the cable 7, a desired tension pressure can be applied to the cable 7.

The horizontal thickness of the powered sliding unit 6 becomes thinner than that of a conventional one. Since, in the conventional powered sliding unit, a wire drum is attached to a horizontal base plate using a vertical shaft, the horizontal thickness of the sliding unit is larger than the diameter of the wire drum. However, according to the present invention, the wire drum 26 of the sliding unit 6 is attached to the vertical base plate 25 by the horizontal shaft 34, and therefore, the horizontal thickness of the sliding unit 6.can be set to be substantially equal to the thickness of the wire drum 26. Further, since the thickness of the wire drum 26 can be easily decreased by increasing the diameter of the wire drum 26, the horizontal thickness of the sliding unit 6 can be easily decreased. Thus, the sliding unit 6 of the present invention can be easily stored in the inner space 5 inside of the side panel 3.

Referring again to FIG. 1, the sliding door 1 has a front latch unit 86 adapted to be engaged with a front striker 85 fixed to the vehicle body 2, and a front latch unit 88 adapted to be engaged with a rear striker 87 fixed to the vehicle body 2. When the sliding door 1 is slid toward the closed position, the front latch unit 86 is at first engaged with the front striker 85, and thereafter, the rear latch unit 88 is engaged with the rear striker 87. The engagement between the rear latch unit 88 and the rear striker 87 includes two kinds of engagement, that is, a half-latch engagement as an initial engagement and a full-latch engagement as a complete engagement. The sliding of the door 1 toward the closed position by the sliding unit 6 is continued until the half-latch engagement is attained.

The slide door 1 has a powered closing unit 89 for achieving the full-latch engagement, and a connector 91 connected to the powered closing unit 89 through an electric cable 90. A connector 92 is provided on the vehicle body 2 and connected to a battery 93. By the sliding of the door 1 toward the closed position, the connector 91 of the door 1 makes contact with the connector 92 of the body 2 before the rear latch unit 88 is initially engaged with the rear striker 87, and then, the powered closing unit 89 is supplied with the electric power from the battery 93.

A control unit 200 for controlling the powered sliding unit 6 and the powered closing unit 89 is provided in the vehicle body 2. The control unit 200 is connected to the rear latch unit 88 through a plurality of signal cables 94.

Between the powered closing unit 89 and the rear latch unit 88, a wire cable 89 for transmitting the power from the closing unit 89 to the rear latch unit 88 is provided. When the control unit 200 receives a half-latch signal from the rear latch unit 88 through the signal cables 94, it actuates the powered closing unit 89 so as to draw the wire cable 95, thereby the condition of the rear latch unit 88 is displaced into the full-latch condition from the half-latch condition.

Figure 21:
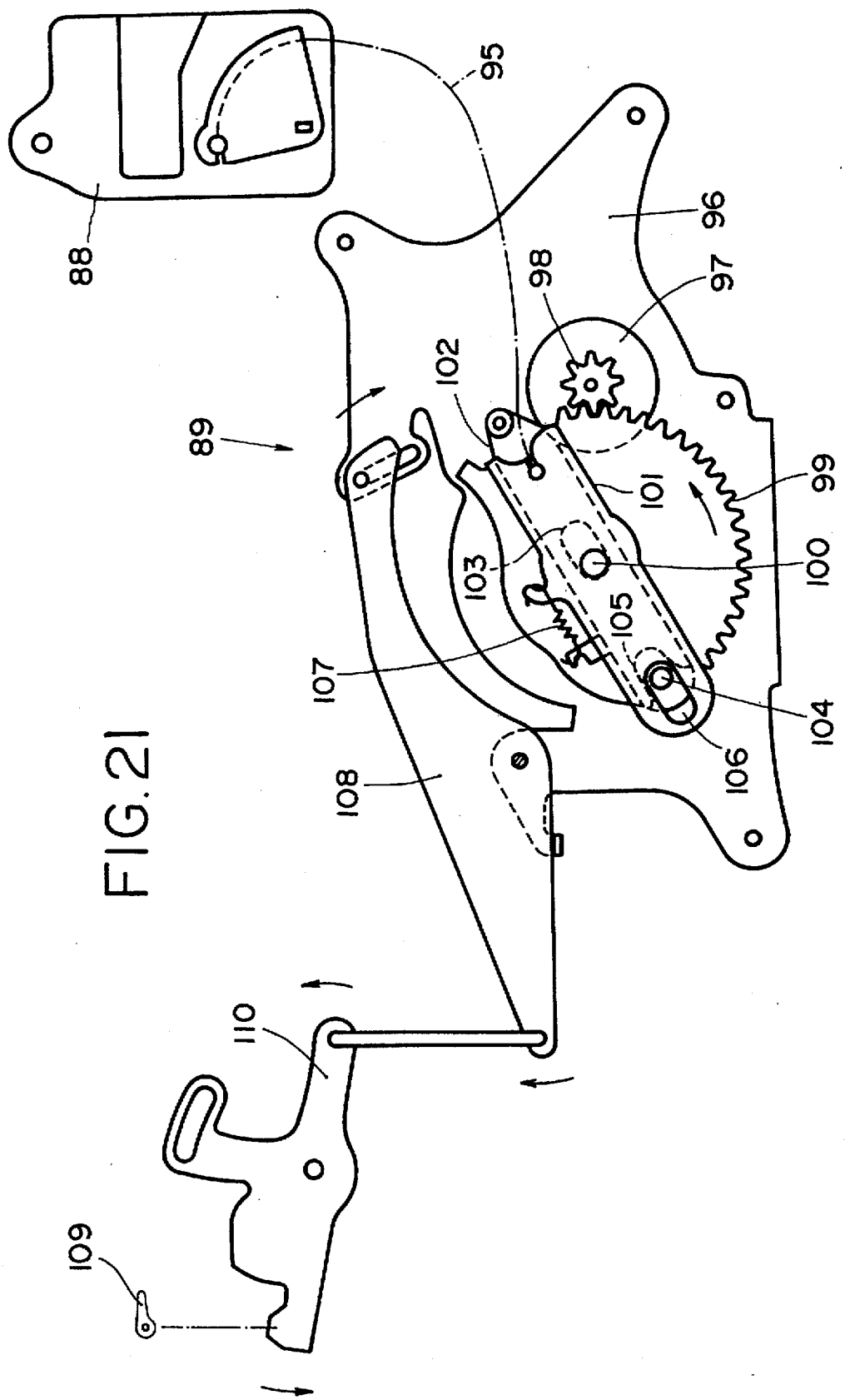
FIG. 21 is a front view showing the powered closing unit.

Referring to FIG. 21 which shows the powered closing unit 89 in detail, a motor 97 is secured to a base plate 96 of the closing unit 89. A sector gear 99 is meshed with an output gear 98 of the motor 97 and is journalled to the base plate 96 by a shaft 100. A winch lever 101 to which one end of the wire cable 95 is engaged is rotatably journalled to the shaft 100. A coupling lever 102 is provided between the winch lever 101 and the sector gear 99. The coupling lever 102 is formed therein an elongated hole 103 into which the shaft 100 is inserted, and accordingly, the coupling lever 102 can be slid by a degree corresponding to a play between the elongated hole 103 and the shaft 100.

The coupling lever 102 is provided at its one end with a pair of pin portions 104 projected toward both sides of the lever 102. One of the pin portions 104 is engaged with a U-shaped recess 105 of the sector gear 99, and the other of the pin portions 104 is engaged in an elongated hole 106 of the winch lever 101. The coupling lever 102 is biased by the resilient force of a spring 107 so that the engagement between the pin portion 104 and the recess 105 is maintained.

When the rear latch unit 88 comes to the half-latch condition, the motor 97 of the closing unit 89 begins to rotate. Then, the sector gear 99 is turned counterclockwise as viewed in FIG. 21 and the winch lever 101 is also turned counterclockwise so as to draw the wire cable 95 since the pin portions 104 are engaged with both the U-shaped recess 105 and the elongated hole 106. Thereby, the power of the closing unit 89 is transmitted to the rear latch unit 88 and the condition of the latch unit 88 is displaced into the full-latch condition. Thus, according to the present invention, the sliding door 1 in the open condition is slid under the power of the sliding unit 6 until it comes to the half-latch condition, and thereafter, it comes to the full-latch condition under the power of the closing unit 89. Accordingly, in order to close the door 1 the driver is only required to turn on an operating switch.

A cancelling lever 108 for shutting off a power transmission path between the motor 97 and the rear latch unit 88 is rotatably mounted of the base plate 96. The cancelling lever 108 is coupled to an open lever 110 adapted be turned by an outer open handle or an inner open handle 109 of the door 1. When the cancelling lever 108 is turned by the open handle 109 through the intermediary of the open lever 110 during rotation of the sector gear 99 by the motor 97, the cancelling lever 108 is engaged with a tip end of the coupling lever 102. Then, the lever 102 slides against the resilient force of the spring 107 so as to release the pin portion 104 from the U-shaped recess 105 of the sector gear 99. Therefore, the power transmission path between the motor 97 and the rear latch unit 88 is shut off. This cancelling manipulation is carried out if the operator catches his hand, clothes, bag or the like in the door 1.

Figure 22:
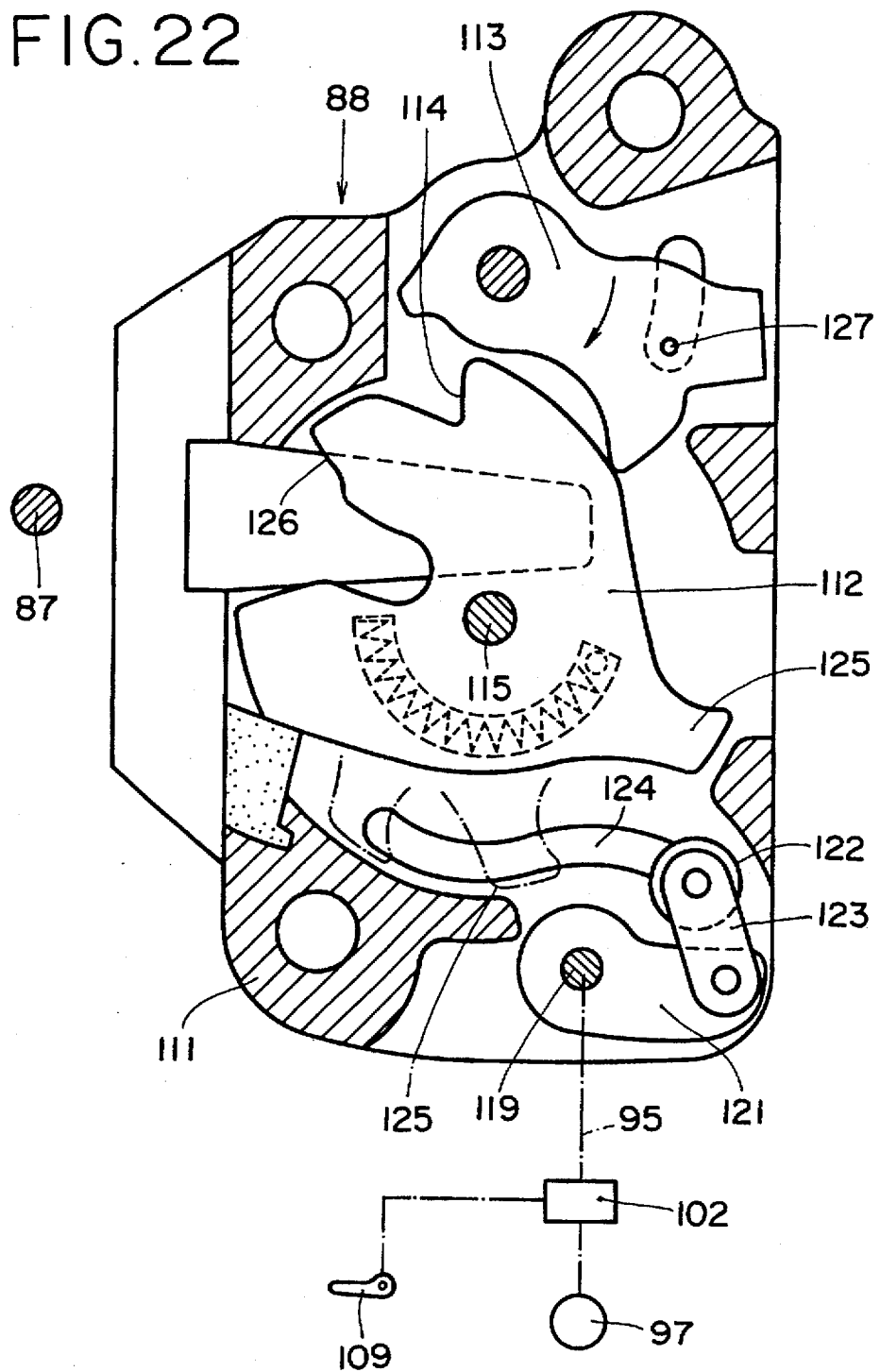
FIG. 22 is a longitudinally sectional view showing a rear latch unit.
Figure 23:
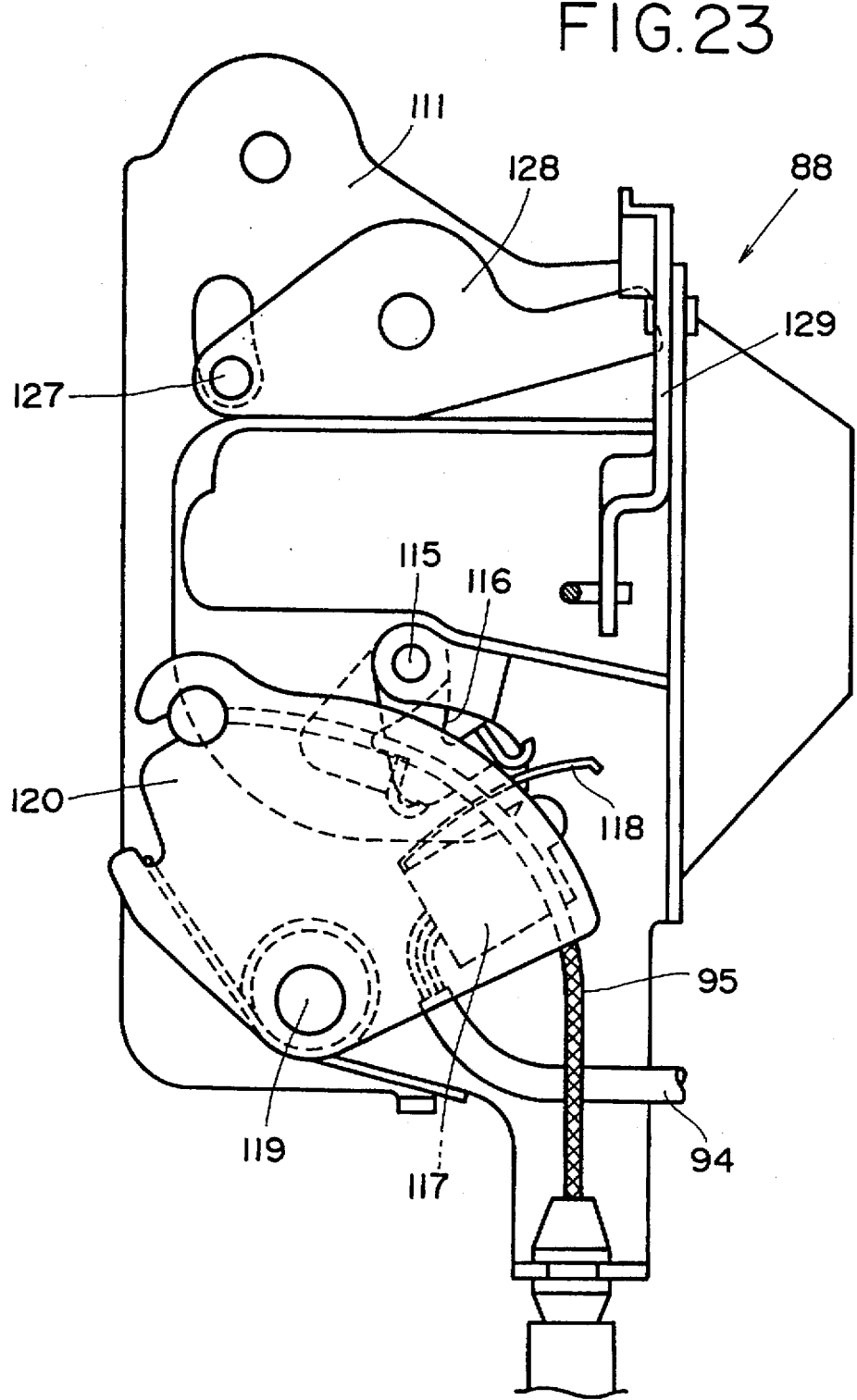
FIG. 23 is a rear view of the rear latch unit.

Referring to FIGS. 22 and 23 which show the rear latch unit 88, a latch 112 adapted to be engaged with the rear striker 87 and a ratchet 113 adapted to be engaged with the latch 112 so as to maintain the engagement between the latch 112 and the striker 87 are stored in a latch body 111 of the rear latch unit 88. The ratchet 113 is engaged with a half-latch step portion 114 of the latch 112 when the latch 112 is turned to the half-latch condition or position due to the engagement between the latch 112 and the striker 87.

A latch shaft 115 for supporting the latch 112, is fixed thereto with a switch lever 116, as shown in FIG. 23, which is turned together with the latch 112. When the latch 112 comes to the half-latch position, the switch lever 116 makes contact with a terminal arm 118 of a switch 117. Accordingly, the switch 117 sends a half-latch signal to the control unit 200 through the signal cables 94.

A cable lever 120 is journalled to the latch body 111 by a shaft 119. One end of the wire cable 95 is engaged with the cable lever 120. A rotating arm 121 is fixed to the shaft 119 so as to be rotated together with the cable lever 120. A link 123 having a roller 122 is rotatably connected to the rotating arm 121. The roller 122 is moved along a guide groove 124 formed in the latch body 111 when the cable lever 120 is turned by the force of the powered closing unit 89.

The latch 112 is provided with a leg portion 125 which overlaps with the guide groove 124 when in the half-latch position. When the latch 112 comes to the half-latch position, the roller 122 moves along the guide groove 124 by the power of the closing unit 89 and makes contact with the leg portion 125 of the latch 112, thereby the latch 112 is turned to the full-latch position from the half-latch position. Then, the ratchet 113 is engaged with a full-latch step portion 126 of the latch 112. When the latch comes to the full-latch position, the switch lever 116 comes away from the terminal arm 118, and accordingly, the switch 117 sends a full-latch signal to the control unit 200 through the signal cables 94.

A ratchet lever 128 coupled to the ratchet 113 by a pin 127 is journalled to the latch body 111. An intermediate lever 129 adapted to be turned by the open handle 109 is provided in the vicinity of the ratchet lever 128. When the intermediate lever 129 is rotated by the opening operation of the open handle 109, it engages with the ratchet lever 128 so as to release the ratchet 113 from the latch 112. Then, the door 1 is open.

Figure 1:
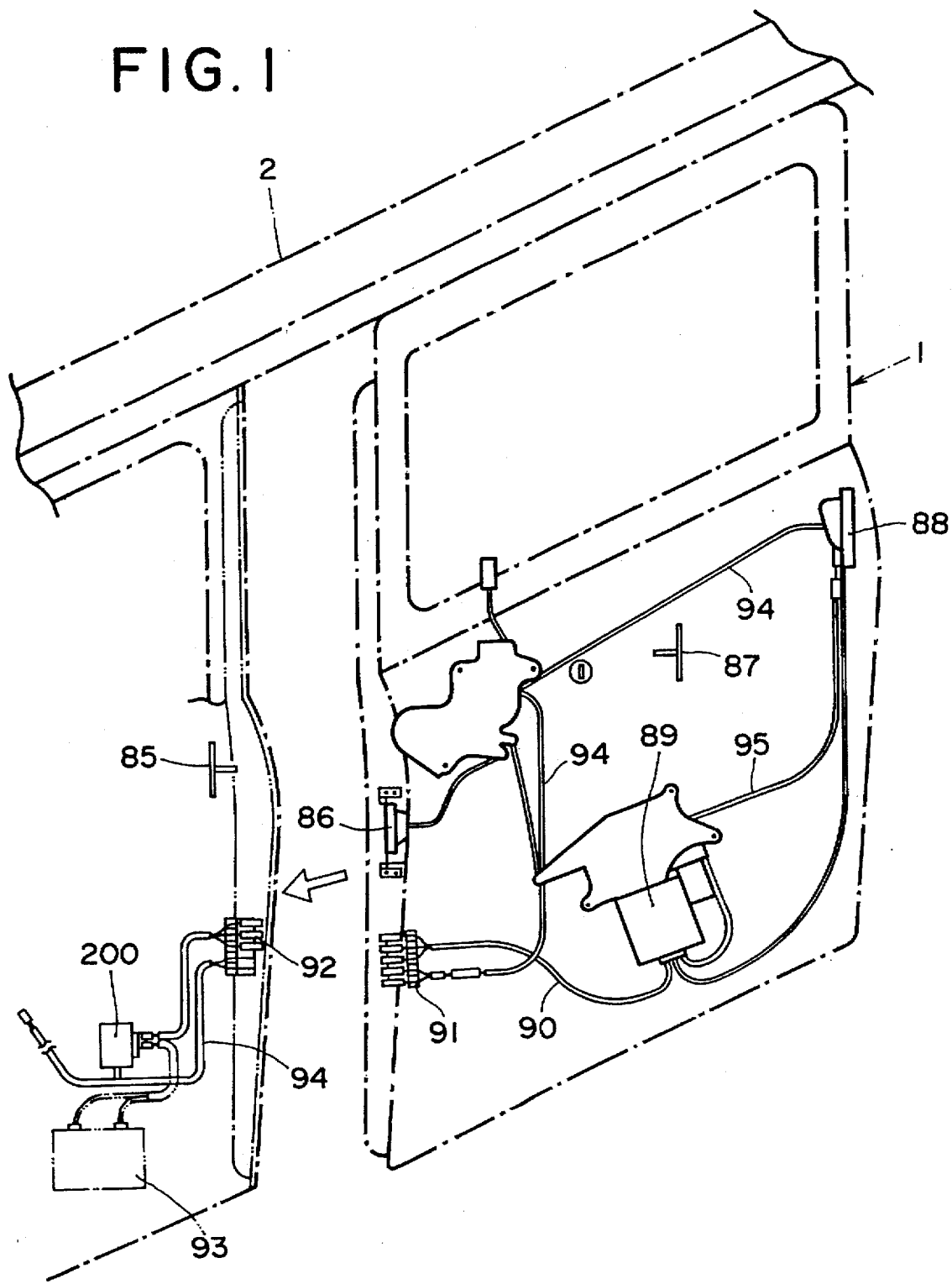
FIG. 1 is a perspective view showing a powered closing unit attached to a sliding door according to the present invention.
Figure 24:
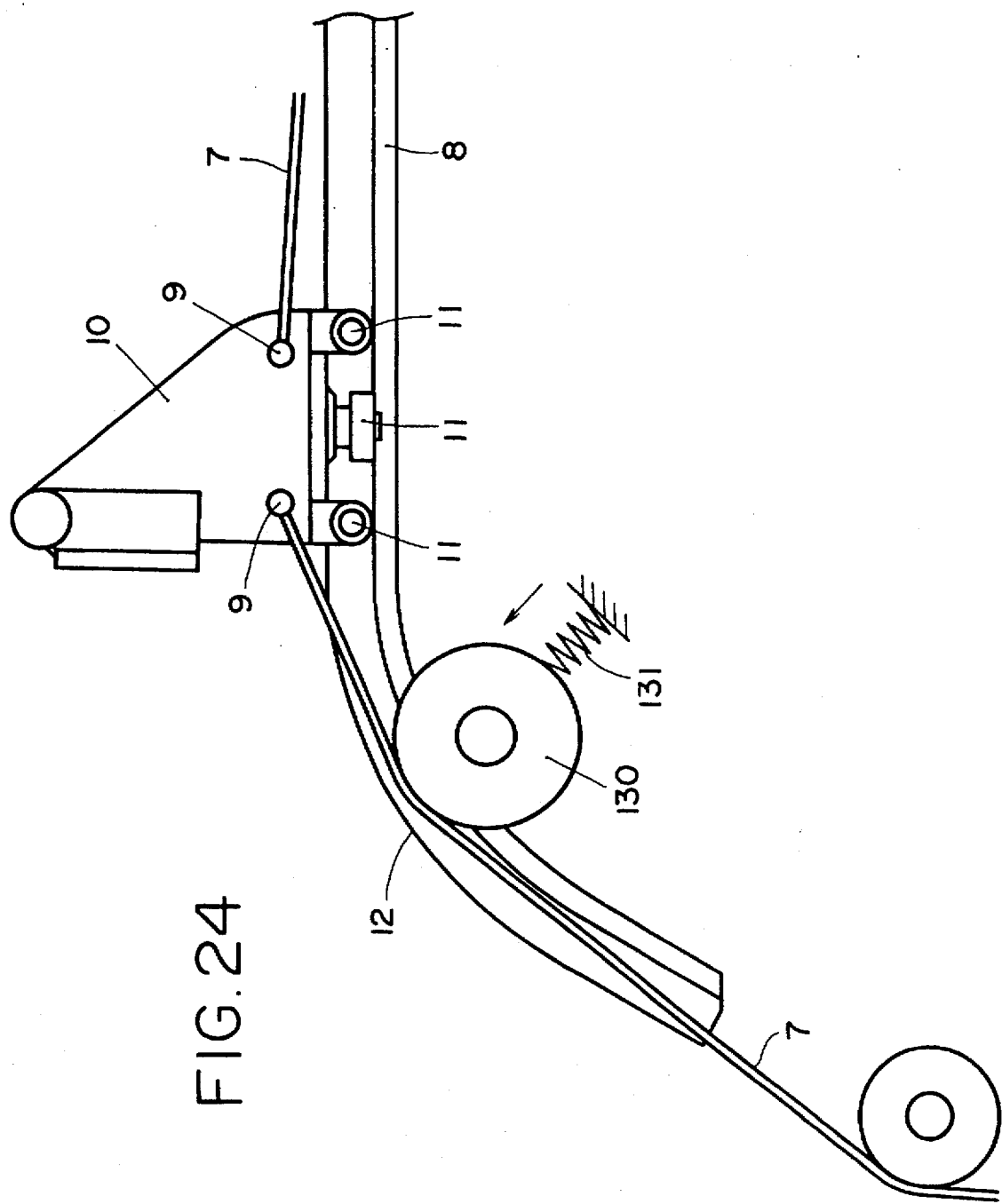
FIG. 24 is an enlarged view showing a corner portion of the guide rail and the coupling bracket.

Referring again FIG. 1, it is found that the wire cable 7 makes strongly contact with the corner portion 12 of the guide rail 8. This contact cause abrasion of the cable 7 and the guide rail 8. According to the present invention, as shown in FIG. 24, a roller 130 is rotatably attached to the corner portion 12 of the guide rail 8. The roller 130 is preferably urged in the direction of the arrow by the resilient force of a spring 131.

The roller 130 provided to the corner portion 12, has another role. As shown in FIG. 24, the end parts 9 of the cable 7 coupled to the coupling bracket 10 are separated from the guide rail 8. In such a condition, the distance between the end parts 9 and the wire drum 26 differs at the time when the coupling bracket 10 is positioned in a straight portion of the guide rail 8 from the time when the coupling bracket 10 is positioned in the corner portion 12 of the guide rail 8, and accordingly, the tension pressure of the cable 7 varies. However, according to the present invention, the roller 130 is provided to the corner portion 12, and accordingly, the difference in the distance between the end part 9 and the wire drum 26 is decreased, thereby it is possible to reduce variation tension pressure of the cable 7.

What is claimed is:

1. A tension apparatus of a powered sliding device on a vehicle sliding door, comprising;
    a base plate;
    a motor fixed to the base plate;
    a wire drum mounted to the base plate by a first shaft and rotated by the motor;
    a wire cable provided between the vehicle sliding door and the wire drum for pulling the sliding door forward or rearward when the wire drum rotates;
    first and second tension arms rotatably mounted on the first shaft, each of said tension arms having a tension roller which makes contact with the wire cable;
    at least one intermediate lever rotatably mounted on the first shaft;
    an adjusting member for fixing the first tension arm and the intermediate lever so that an angle of the first tension arm and the intermediate lever can be adjusted;
    wherein, a tension spring is arranged to act between the intermediate lever and the second tension arm.

2. A tension apparatus as set forth in claim 1, wherein said adjusting member is rotatably mounted on the first tension arm or the intermediate lever.

3. A tension apparatus as set forth in claim 2, wherein said adjusting member has a gear portion which is engaged with the other of the first tension arm or the intermediate lever.

4. A tension apparatus as set forth in claim 3, wherein said adjusting member has a plurality of protrusions, wherein said one of the first tension arm or the intermediate lever has a plurality of holes in which the protrusions are engaged.

5. A tension apparatus as set forth in claim 4, wherein an engagement of the protrusions and the holes are maintained by a resilient force of a holding spring.

6. A tension apparatus as set forth in claim 5, wherein said one of the first tension arm or the intermediate lever has a pin to which the adjusting member rotatably mounted.

7. A tension apparatus as set forth in claim 5, wherein said adjusting member has a groove with which a plus driver is engageable.

8. A tension apparatus of a vehicle door powered sliding device, comprising;
    a base plate;
    a motor fixed to the base plate;
    a wire drum mounted to the base plate by a first shaft and rotated by the motor;
    a wire cable provided between a vehicle sliding door and the wire drum for pulling the sliding door forward or rearward when the wire drum rotates;
    first and second tension arms rotatably mounted on the first shaft, each of said tension arms having a tension roller which makes contact with the wire cable;
    first and second intermediate levers rotatably mounted on the first shaft;
    a first adjusting member for fixing the first tension arm and the first intermediate lever so that an angle of the first tension arm and the first intermediate lever can be adjusted;
    a second adjusting member for fixing the second tension arm and the second intermediate lever so that an angle of the second tension arm and the second intermediate lever can be adjusted;
    a tension spring provided between the first intermediate lever and the second intermediate lever.

9. A tension apparatus as set forth in claim 8, wherein said first adjusting member is rotatably mounted on one of the first tension arm or the first intermediate lever, wherein said second adjusting member is rotatably mounted on one of the second tension arm or the second intermediate lever.

10. A tension apparatus as set forth in claim 9, wherein said first adjusting member has a first gear portion which is engaged with the other of the first tension arm or the first intermediate lever, wherein said second adjusting member has a second gear portion which is engaged with the other of the second tension arm or the second intermediate lever.

11. A tension apparatus as set forth in claim 10, wherein said first adjusting member has a plurality of first protrusions, said second adjusting member has a plurality of second protrusions, wherein said one of the first tension arm or the first intermediate lever has a plurality of first holes in which the first protrusions are engaged, said one of the second tension arm or the second intermediate lever has a plurality of second holes in which the second protrusions are engaged.

12. A tension apparatus as set forth in claim 11, wherein engagements of the first protrusions and the first holes and of the second protrusions and the second holes are maintained by resilient forces of holding springs, respectively.

13. A tension apparatus as set forth in claim 12, wherein said one of the first tension arm or the first intermediate lever has a first pin to which the first adjusting member rotatably mounted, said one of the second tension arm or the second intermediate lever has a second pin to which the second adjusting member rotatably mounted.

14. A tension apparatus as set forth in claim 12, wherein each of said adjusting members has a groove with which a plus driver is engageable.

* * * * *